United States Patent [19]

Townsend

[11] 3,916,942
[45] Nov. 4, 1975

[54] AIR-POWERED SPRINKLER SYSTEM

[76] Inventor: Loren R. Townsend, Sidney, Nebr. 69162

[22] Filed: Jan. 10, 1975

[21] Appl. No.: 540,112

[52] U.S. Cl. ................ 137/344; 188/170; 239/177
[51] Int. Cl.² .......................................... B05B 3/12
[58] Field of Search ............ 239/177, 212; 137/344; 180/74; 188/74, 170

[56] References Cited
UNITED STATES PATENTS

| | | | |
|---|---|---|---|
| 3,606,161 | 9/1971 | Paul | 137/344 X |
| 3,766,937 | 10/1973 | Lundvall et al. | 239/212 X |
| 3,866,836 | 2/1975 | Dowd | 137/344 X |

Primary Examiner—M. Henson Wood, Jr.
Assistant Examiner—Michael Mar
Attorney, Agent, or Firm—Zarley, McKee, Thomte & Voorhees

[57] ABSTRACT

An air-powered sprinkler system for sprinkling or irrigating a relatively large area surrounding a central pivot point. An overhead water supply pipe extends outwardly from the central pivot point and is supported by a plurality of spaced apart, wheeled towers. An air-powered drive mechanism is provided on each of the towers to propel the towers and water supply pipe around the central pivot point. A control system is provided on each of the towers for selectively operating the drive mechanism associated therewith to maintain the pipe and towers in an aligned condition as the water supply pipe is pivoted around the central pivot point. A safety valve is provided in the air circuit on each of the towers to de-activate the drive mechanism on all of the towers upon one of the towers moving out of alignment to a pre-determined degree with the other towers to prevent structural damage to the apparatus. The control system comprises a rotary cam plate having an alignment rod secured thereto which extends to the gimbal ring on a flexible joint positioned on the water supply pipe adjacent the tower.

9 Claims, 8 Drawing Figures

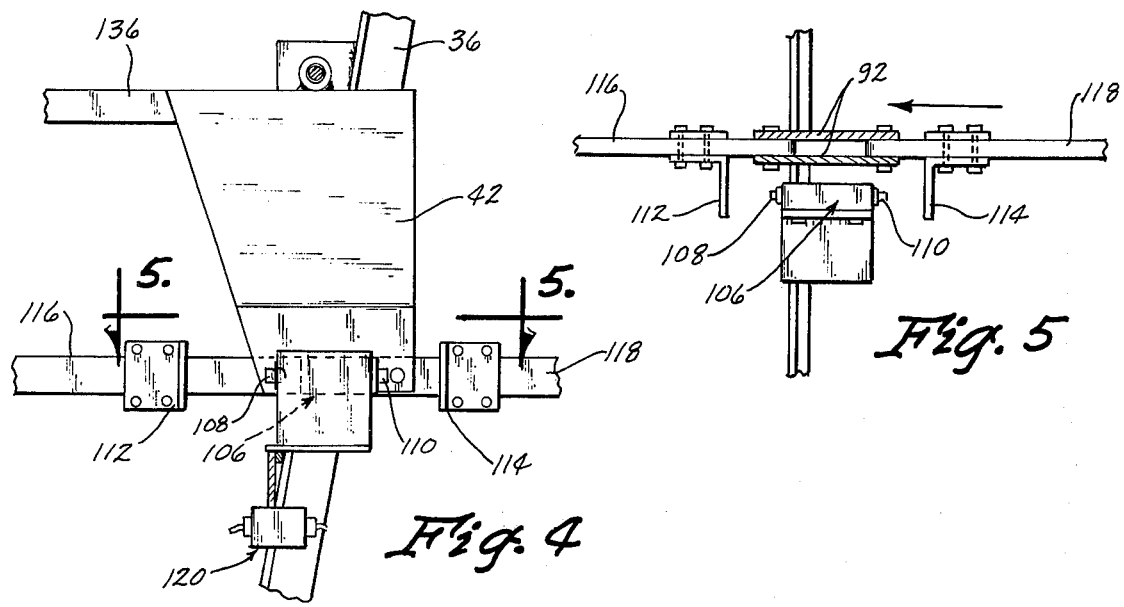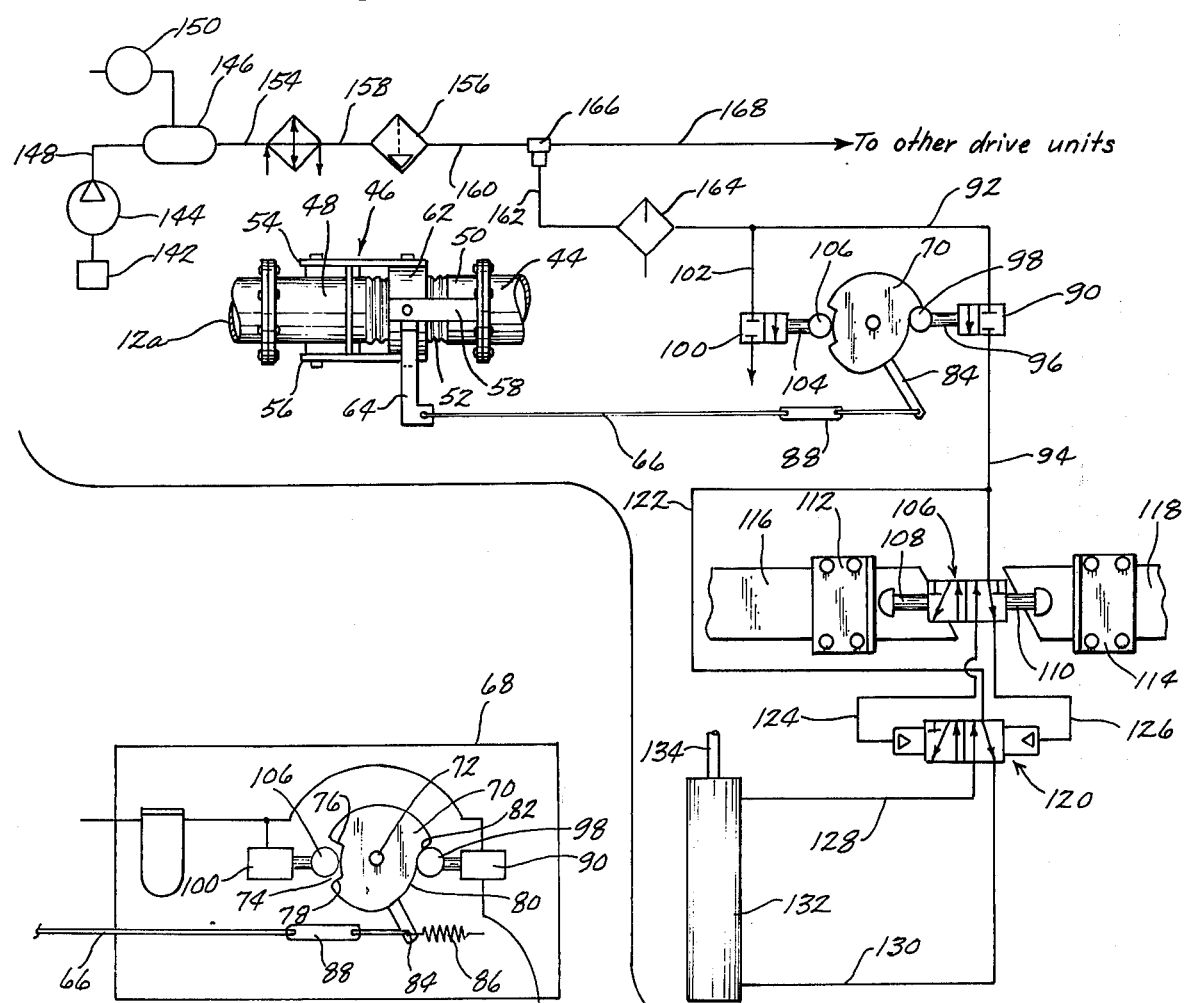

AIR-POWERED SPRINKLER SYSTEM

BACKGROUND OF THE INVENTION

This invention relates to an air-powered sprinkler system and more particularly to an air-powered sprinkler system of the central point or center pivot type.

It has been found to be economically feasible to irrigate large areas of land through the use of a long water pipe extending from a central pivot point which is supported by a plurality of driven towers which are spaced along the length thereof. Alignment means has been provided on systems of this type to maintain the towers and supply pipe in an aligned condition as the pipe and towers are moved around the central pivot point.

Some of the central pivot systems have electric drive means on the various towers to propel the towers around the central pivot point. A problem with the electrically driven systems is the difficulty in supplying electrical current to the system as well as to the individual towers. Some self-propelled sprinkling systems employ water drive means on the towers but these have been found to be somewhat less than desirable since a certain amount of water power which would ordinarily be sprinkled on the crop is diverted to the drive means.

U.S. Pat. No. 3,606,161 which issued Sept. 20, 1971 represented a distinct improvement in the alignment systems of the prior art since the alignments available before the invention disclosed in said patent were less than satisfactory due to the inability of the same to deactivate the entire system in the event that one of the towers would become drastically out of alignment with respect to the other towers. U.S. Pat. No. 3,606,161 employed an air-powered drive means on the individual towers and experienced generally satisfactory results in the field. The present invention is being manufactured by Sidney Manufacturing Corporation of Sidney, Nebraska which is the owner of U.S. Pat. No. 3,606,161. While the sprinkling apparatus and safety means therefor disclosed in U.S. Pat. No. 3,606,161 did represent a distinct improvement in the art, the instant invention has been found to be more efficient and requires less maintenance. Additionally, the alignment system of the instant invention is much more sensitive than that described in U.S. Pat. No. 3,606,161 and requires less adjustment.

Therefore, it is a principal object of the invention to provide an air-powered sprinkler system.

A further object of the invention is to provide an air-powered sprinkler system having an improved control means associated therewith.

A further object of the invention is to provide an air-powered sprinkler system including means to deactivate the entire system when one of the towers thereof becomes out of alignment with the remaining towers.

A further object of the invention is to provide an air-powered sprinkler system and safety means therefor which is relatively maintenance free.

A further object of the invention is to provide an air-powered sprinkling system which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 4 is a partial side view of the drive means:

FIG. 5 is a sectional view seen on lines 5—5 of FIG. 4:

FIG. 6 is a schematic view of the circuitry of the apparatus:

FIG. 7 is a side elevational view of the alignment plate of this invention and the structure mounted thereon.

DESCRIPTION OF THE PREFERRED EMBODIMENT

Figure 1:
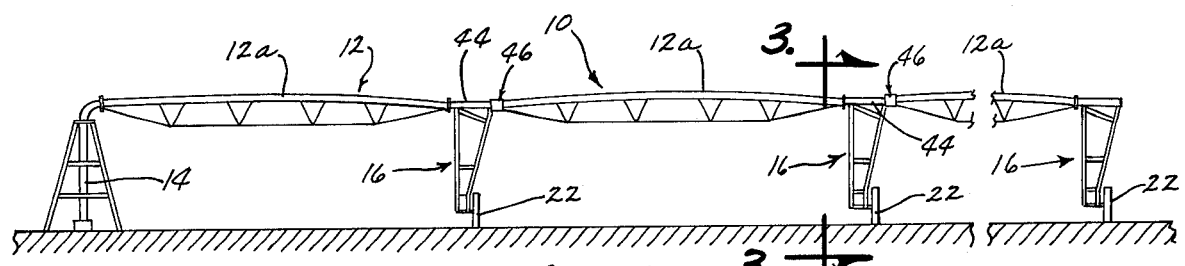
FIG. 1 is a side view of a portion of the apparatus illustrating the water supply pipe being supported by a plurality of spaced apart towers.
Figure 2:
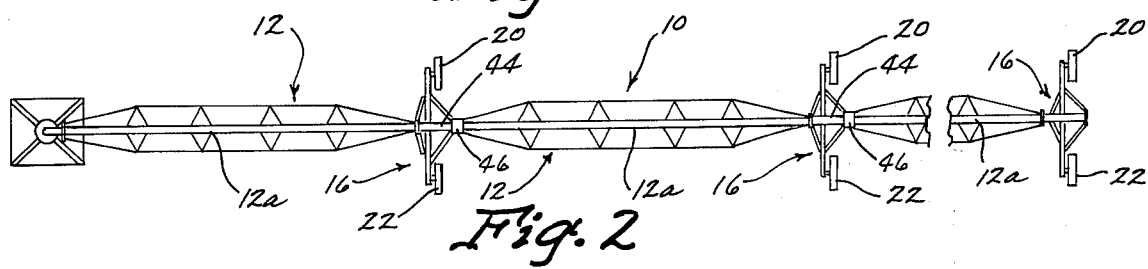
FIG. 2 is a top view of the apparatus of FIG. 1.

The sprinkling apparatus of this invention is generally designated by the reference numeral 10 in FIGS. 1 and 2 and includes a water supply pipe 12 extending outwardly from a central or center pivot point 14 which is in communication with a source of water under pressure. The pipe 12 is comprised of a plurality of tubular sections 12-a suitably connected together in an end-to-end relationship and supported by a plurality of towers 16.

Each of the towers 16 generally comprises a horizontally disposed frame member 18 having drive wheels 20 and 22 rotatably mounted at the opposite ends thereof as illustrated in the drawings. Wheels 20 and 22 are provided with a plurality of driving lugs 24 and 26 mounted on the periphery thereof respectively. The driving lugs extend laterally outwardly from the wheels.

Frame members 28 and 30 are secured at their lower ends to frame member 18 and extend upwardly therefrom in a diverging relationship. Likewise, frame members 32 and 34 are secured to frame member 18 and extend upwardly therefrom in a diverging relationship. Frame members 36 and 38 are secured to frame member 18 and extend upwardly therefrom and have their upper ends secured to frame members 28 and 30 respectively by any convenient means such as bolts or the like. Brace 40 is secured to and extends between frame members 36 and 38 adjacent the upper ends thereof for pivotally supporting a plate 42 as will be described in more detail hereinafter.

A tubular member 44 is secured to the upper ends of frame members 28, 30, 32 and 34 and extends therebetween as illustrated in the drawings. One end of the tubular member 44 has one end of a pipe member 12a bolted thereto by conventional methods. One end of the universal-joint coupling 46 is secured to the other end of tubular member 44 and is secured to one end of the pipe member 12a. As seen in the drawings, universal-joint 46 comprises members 48 and 50 having a sealing coupling 52 extending therebetween which permits movements between the members 48 and 50. Support arms 54 and 56 are secured to member 48 and extend therefrom while support arms 58 and 60 (not shown) are secured to the member 50 and extend therefrom. Gimble ring 62 extends around the coupling 52 in a spaced apart relationship and has the ends of the arms 54, 56, 58 and 60 pivotally secured thereto. Thus, the universal joint 46 permits pivotal movement about horizontal and vertical axes between the members 48 and 50. The numeral 64 refers to an alignment arm which is secured to the gimble ring 62 and which extends horizontally outwardly therefrom. The numeral 66 refers to an alignment rod which is secured to the outer end of alignment arm 64.

The numeral 68 refers to an alignment panel mounted on the tower and having an alignment cam 70 rotatably mounted thereon about a horizontal axis referred to generally by the reference numeral 72. As seen in FIG. 7, alignment cam 72 is provided with a notch 74 formed in its periphery defined by shoulders 76 and 78. Cam 72 is also provided with a cam surface 80 formed in the periphery thereof having shoulder 82 at one end thereof. Arm 84 is secured to cam 70 by welding or the like and extends downwardly therefrom. Spring 86 is connected to the arm 84 and the alignment panel 68 to urge the cam 70 in a counter-clockwise direction as viewed in FIG. 7 and to resist the clockwise movement of the cam 70 as illustrated in FIG. 7 also. Turnbuckle 88 connects the arm 84 and the alignment rod 66. Alignment valve 90 is mounted on the alignment panel 68 and has air inlet and outlet lines 92 and 94 operatively connected thereto as illustrated in FIG. 6. Alignment valve 90 has a plunger 96 having a roller 98 mounted thereon which is adapted to be engaged by the shoulder 82 on the alignment cam 70 upon sufficient clockwise rotation of the alignment cam 70 so that the alignment valve 90 is opened to permit air to be supplied to line 94.

The numeral 100 refers to a safety valve mounted on alignment panel 68 having an air inlet line 102 in communication therewith. Safety valve 100 is normally closed and has a plunger 104 extending therefrom which has a roller 105 mounted thereon adapted to engage the shoulders 76 or 78 upon predetermined rotation of the alignment cam 70 to a predetermined position. As previously stated, safety valve 100 is normally closed but is exhausted to the atmosphere upon being opened as will be described in more detail hereinafter.

Figure 3:
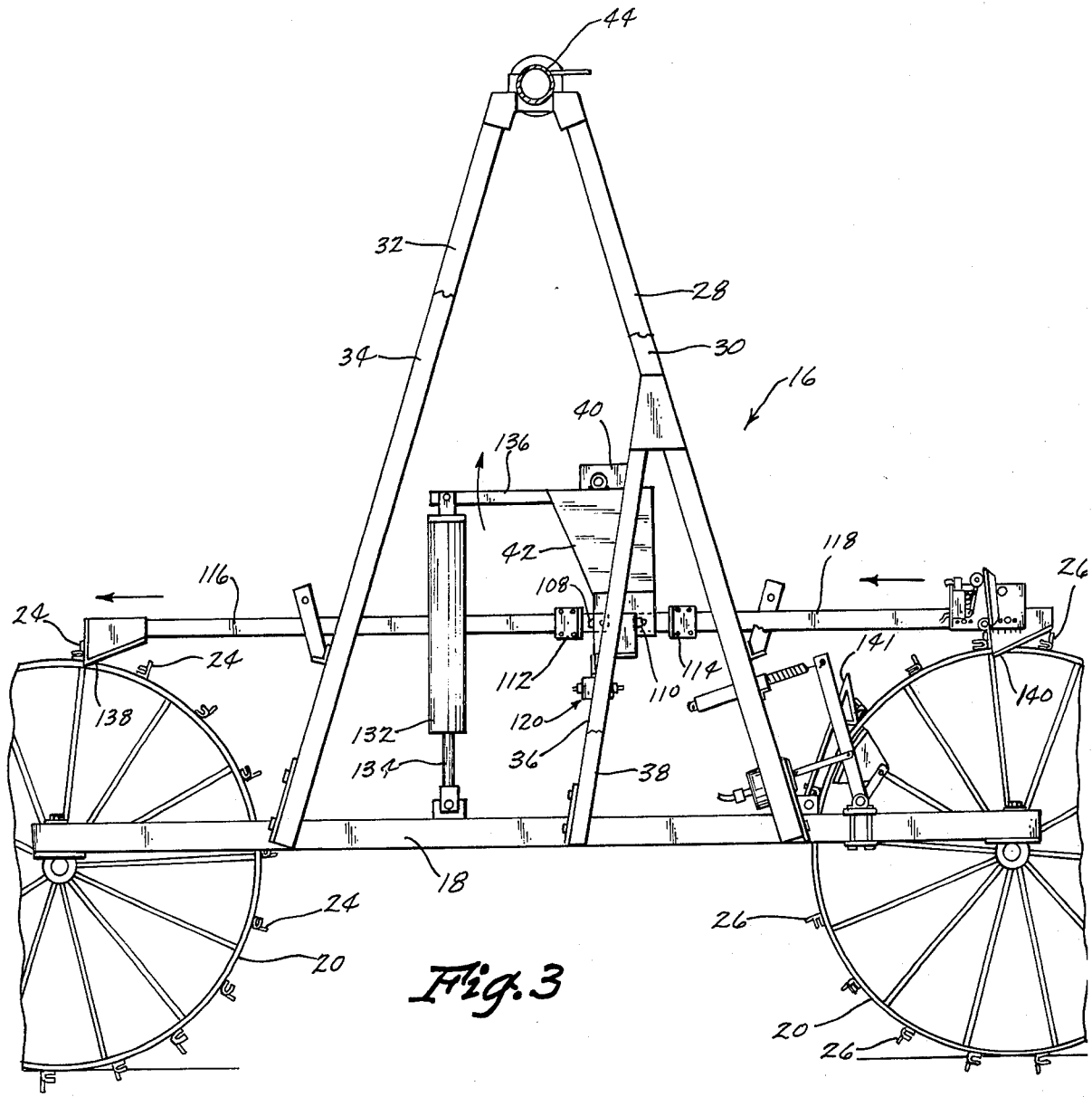
FIG. 3 is an enlarged fragmentary sectional view as seen along lines 3—3 of FIG. 1.

Air line 94 is connected to a four-way valve 106 having plungers 108 and 110 extending from opposite ends thereof. Plungers 108 and 110 are adapted to be engaged by brackets 112 and 114 which are mounted on the trojan bars 116 and 118 respectively. The numeral 120 refers to a pilot operated valve which is connected to air line 94 by air line 122 and which is connected to the valve 106 by air lines 124 and 126 in the manner illustrated in the schematic of FIG. 6. Valve 120 has air lines 128 and 130 extending therefrom which are in communication with the opposite ends of a double acting air cylinder having a rod 134 extending therefrom. The outer end of rod 134 is pivotally connected to frame member 18 (FIG. 3). The base end of the cylinder 132 is pivotally connected to one end of an arm 136 which extends from plate 42. Trojan bars 116 and 118 are pivotally connected at their inner ends to the lower end of plate 42 and extend horizontally outwardly toward the drive wheels 20 and 22 respectively. The ends of the trojan bars 116 and 118 are provided with downwardly extending dogs 138 and 140 respectively which are adapted to engage the laterally extending portions of lugs 24 and 26 respectively as will be described in more detail hereinafter. The numeral 141 refers to a pivotal arm adapted to engage the lugs 26 to prevent the drive tower from rolling "backwards".

The power unit 142 may either be an electric motor or a gasoline engine so as to supply power to an air compressor referred to generally by the reference numeral 144 in FIG. 6. Air compressor 144 is conventionally connected to a surge tank 146 by air line 148. A conventional high-low pressure switch 150 is connected to the surge tank 146 and is designed to deactivate the system if abnormally high or low air pressures are experienced within the surge tank 146. Surge tank 146 is connected to a cooling coil or apparatus 152 by line 154. Cooling apparatus 152 is connected to a conventional filter 156 by line 158. Filter 156 is provided with an air line 160 extending therefrom which extends to the drive units on all of the drive towers. As illustrated in FIG. 6, line 162 is connected to the line 160 at 166 and is connected to a lubricator 164 which is connected to the line 92.

The operation of the apparatus is as follows. Water is supplied through the pipe 12 to the various sprinkler heads provided thereon and compressed air is furnished to the tank 146 from the compressor 144. The air is piped to the tank 146 thence through the cooling apparatus 152 and thence into the moisture trap or filter 156. The air is supplied to the T-connection referred to generally by the reference numeral 166. The T-connection 166 would be provided at the number one tower, that is, the tower closest to the central pivot point, to permit the compressed air to pass through the line 162 to the control means on the number one tower and to pass through the line 168 to the other drive towers in the system. As previously stated, an alignment panel 68 is provided on each of the towers (except the lead or outer tower) for maintaining proper alignment of the individual drive units. Ordinarily, air under pressure is always supplied to the drive means on the lead tower when the system is operating so that the lead tower is constantly being propelled.

At the inboard end (closest to the pivot point) of each truss section, mounted adjacent to the drive unit, is the flexible or universal joint 46 which is a part of the water pipe. The purpose of the flexible joint 46 is to allow angular deflection of the water line both in a horizontal and vertical plane so that the sprinkler system may operate on rough and uneven terrain. The alignment arm 64 is attached to the gimble ring 62 so as to control the position of each drive unit in relation to the other drive units.

Alignment valve 90 is normally closed but is opened by the alignment cam 70 as soon as the tower becomes out of engagement with the adjacent tower. When valve 90 is opened, air would pass through the alignment valve 90 so as to be supplied to the valves 106 and 120 as previously described. With the alignment valve 90 open, system pressure flows to the four-way valve 106 which is situated within the drive unit so as to be controlled by the two brackets 112 and 114 which are mounted on the trojan bars 116 and 118 respectively in such a way that when the cylinder 132 reaches its fully extended position, the plunger 110 will be engaged by the bracket 114 so that the valve will be shifted which in turn allows the system pressure to shift the four-way valve 120 causing the cylinder to return to the retracted position at which time the opposite bracket 112 engages the plunger 108 which causes the four-way valve 106 to be shifted to its original position, thereby allowing system pressure to shift the four-way valve 120 to its original position, thereby pressurizing the cylinder 132 causing the cylinder rod 134 to be extended at which time the bracket 114 again shifts the four-way valve 106 and a new cycle is commenced.

Longitudinal movement of the trojan bars as described causes the dogs on the ends thereof to engage the driving lugs on the wheels so that the drive wheels are rotated a predetermined increment for each stroke or cycle of the trojan bars. As soon as the described tower moves back into alignment, valve 90 is moved to its closed position by the cam 70 thereby preventing system pressure from further operating the cylinder 132. Whenever a drive tower or unit again falls behind its proper position in relation to the other drive units, the alignment arm 64 moves the alignment rod 66 in such a manner so as to rotate the alignment cam 70 in a clockwise direction. The rotation of the alignment cam 70 in a clockwise direction results in an opening of the alignment valve 90. As the alignment valve 90 opens, system pressure is allowed to flow to the four-way valve 120 as previously described so that the hydraulic cylinder 132 is activated to cause the drive tower to be propelled into alignment with the other towers. If a drive unit fails to move into proper alignment, the alignment cam 70 is further rotated clockwise so that the safety valve 100 is opened thereby allowing the system pressure to be exhausted to the atmosphere which causes the power unit 142 to be deactivated through the pressure shut-off switch 150 which senses the drop in the pressure in the surge tank 146. If a drive unit should roll ahead so as to be excessively out of alignment with the other drive units, the alignment arm 64 on the flexible joint 46 moves the alignment rod 66 with the help of the alignment spring 86 so as to cause the alignment cam 70 to be rotated in a counterclockwise direction, thereby maintaining a closed position of the alignment valve 90 and opening the safety valve 100 so that the system pressure is exhausted to the atmosphere which results in the power unit 142 being de-activated through the pressure shut-off switch 150.

Figure 8:
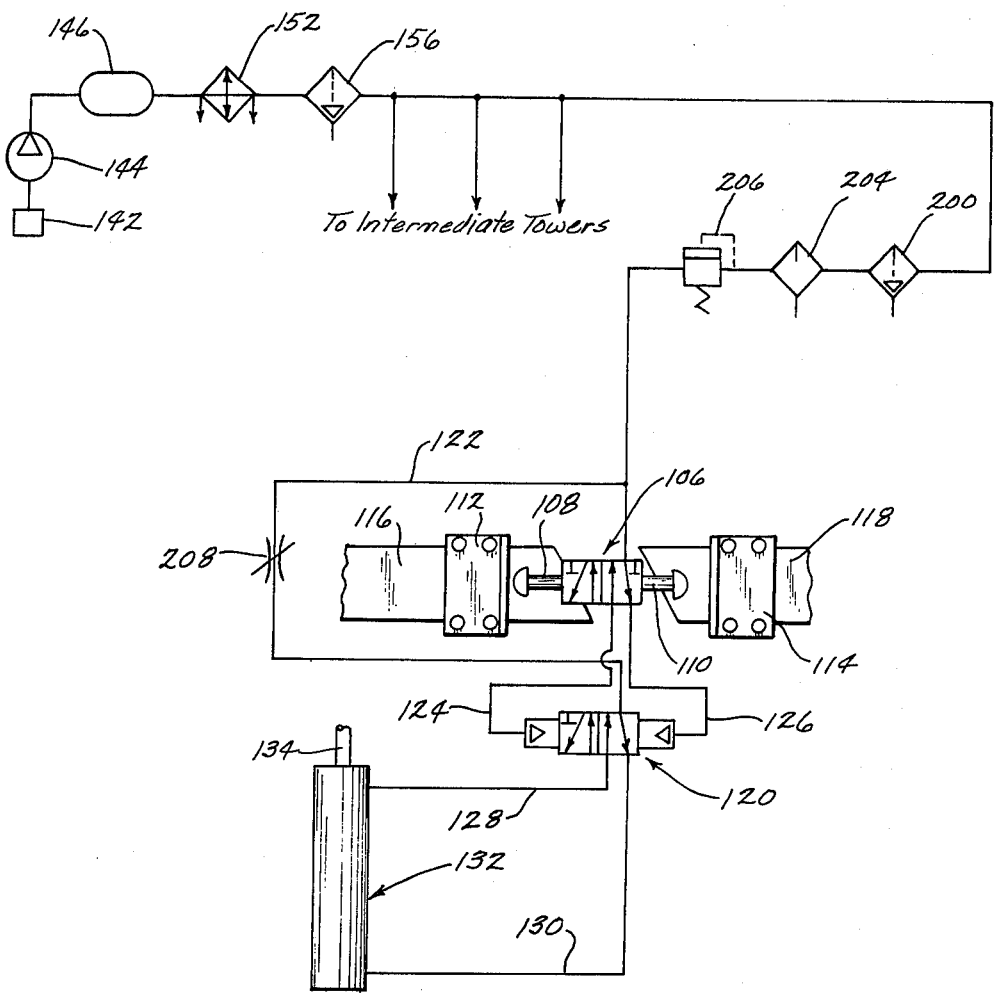
FIG. 8 is a schematic view of the circuitry for the lead tower.

FIG. 8 illustrates the circuitry for driving the lead drive unit on the pivot sprinkler. The circuitry of FIG. 6 is the circuitry which may be provided on all of the intermediate towers. The drive means on the lead tower is different than that of the intermediate tower since an alignment cam is not ordinarily provided thereon.

In FIG. 8, the numerals 142, 144, 146, 152 and 156 designate the power source, air compressor, surge tank, cooling apparatus and filter respectively such as illustrated in FIG. 7. System pressure is supplied to the individual drive units as previously described. The lead drive unit system pressure flows through a filter 200, lubricator 204 and sequence valve 206. The system pressure flows from sequence valve 206 to the valve 106, valve 120 and air cylinder 132 as previously described. As seen in FIG. 8, the needle valve 208 is imposed in line 122. The system pressure is supplied to the four-way valve 106 which is situated within the drive unit so as to be controlled by the brackets 112 and 114 which are mounted on the trojan bars in such a way that when the cylinder 132 reaches the fully extended position, the valve 106 will be shifted by the bracket 114 which in turn allows system pressure to shift the four-way valve 120 causing the cylinder 132 to return to the retracted position at which time the bracket 112 causes the four-way valve 106 to be shifted to its original position, thereby pressurizing the cylinder 132 causing the cylinder rod to be extended at which time bracket 114 again shifts the four-way valve 106 and a new cycle is commenced.

The needle valve 208 is installed in the line 122 to control the flow of air to the cylinder 132, thereby controlling the speed of the lead drive unit which in turn, through the alignment system incorporated in the intermediate towers, controls the speed of the total system.

The sequence valve 206 is installed in the lead drive unit circuitry so as to prevent the flow of air to the cylinder 132 until such a time as the system pressure has built up to a level sufficient to power the complete system.

Thus it can be seen that an improved control means has been provided for an air-powered sprinkling system which is extremely efficient in operation and which positively maintains the drive units or towers in proper alignment as the water supply pipe is pivoted around the central pivot point. The control means described herein requires very little maintenance and is extremely durable and reliable in use. Thus, it can be seen that the invention disclosed herein accomplishes at least all of its stated objectives.

I claim:

1. A self-propelled sprinkling system, comprising, a water supply pipe movable about a central pivot point, a plurality of spaced apart, wheeled drive towers supporting said supply pipe above the area to be sprinkled, an air operated drive means on each of said towers to propel said towers to move said towers and supply pipe about said central pivot point, a source of compressed air for supplying air under pressure to said drive means, each of said towers comprising a frame means having a pair of spaced apart drive wheels rotatably mounted thereon, a trojan bar means reciprocatably mounted on said frame means and movable between first and second positions for engagement with at least one of said drive wheels for driving said wheel when said trojan bar means moves in at least one direction, an air cylinder mounted on said frame means and being operatively connected to said trojan bar means to reciprocate said trojan bar means, a control means for controlling the operation of said air cylinder so that the associated tower is propelled at the desired rate relative to the other towers in the system, said control means comprising a valve means connected to said source of air pressure and having a pair of opposing valve plungers extending therefrom, said trojan bar means having first and second elements thereon adapted to alternately engage said plungers respectively upon said trojan bar being moved between its said first and second positions by said air cylinder, said valve means causing said air cylinder to be cycled so that reciprocating movement of said trojan bar means is obtained.

2. The system of claim 1 wherein said valve means comprises a first four-way valve means connected to the source of air pressure, a second four-way valve means operatively connected to the discharge side of said first four-way valve means, said second four-way valve means being connected to said air cylinder whereby alternate engagement of said plungers of said first four-way valve means causes the rod of said air cylinder to be alternately extended and retracted.

3. The system of claim 1 wherein a normally closed alignment valve is mounted on at least some of said towers, each of said alignment valves having its inlet end connected to the source of air pressure and its outlet end connected to said valve means, and alignment control means mounted on said tower for opening said alignment valve when said tower moves out of predetermined alignment with an adjacent tower so that said air cylinder will be operated to move said tower into alignment.

4. The system of claim 3 wherein an alignment valve is mounted on each of said towers except the outermost tower relative to said central pivot point.

5. The system of claim 4 wherein each of said towers having alignment valves mounted thereon have inboard and outboard ends relative to said central pivot point, said supply pipe having a flexible joint provided thereon adjacent the inboard end of said towers, and alignment means connecting said flexible joint to the alignment valve on said tower so that said alignment valve is operated in response to angular movement of said tower relative to said flexible joint.

6. The system of claim 5 wherein an alignment cam is rotatably mounted on each of said towers, each of said alignment cams being normally yieldably maintained in a first position, said cam having a first cam surface provided on the periphery thereof, said alignment valve having a plunger arm extending therefrom which is adapted to be engaged by said first cam surface to open said alignment valve when said cam is rotated a predetermined increment by said alignment means.

7. The system of claim 6 wherein said alignment cam has a second cam surface formed in its periphery spaced from said first cam surface, a normally closed safety valve mounted on said tower and having its intake end connected to the source of air under pressure and having its discharge end exhausted to the atmosphere, said safety valve having a plunger arm extending therefrom which is engageable by said second cam surface to open said safety valve to exhaust the system pressure to the atmosphere if said tower should move beyond the safety limits of misalignment.

8. The system of claim 2 wherein a sequence valve is provided on the outermost tower relative to said central pivot point, said sequence valve being imposed in the air line between said source of air pressure and said first four-way valve means to prevent flow of air to the air cylinder until the system pressure has built up to a level to power the drive means on all of the towers.

9. The system of claim 8 wherein a needle valve means is operatively connected to said second four-way valve means for controlling the speed of said outermost tower.

* * * * *